US 6,976,821 B2

(12) United States Patent
Zarske

(10) Patent No.: US 6,976,821 B2
(45) Date of Patent: Dec. 20, 2005

(54) DEVICE FOR THE TRANSLATORY POSITIONING OF A PLATFORM

(75) Inventor: Wolfgang Zarske, Neustadt/Coburg (DE)

(73) Assignee: Machinenfabrik Reichenbacher GmbH, Doerfles-Esbach (DE)

( * ) Notice: Subject to any disclaimer, the term of this patent is extended or adjusted under 35 U.S.C. 154(b) by 0 days.

(21) Appl. No.: 10/451,132

(22) PCT Filed: Dec. 19, 2001

(86) PCT No.: PCT/EP01/15020

§ 371 (c)(1),
(2), (4) Date: Jun. 19, 2003

(87) PCT Pub. No.: WO02/49811

PCT Pub. Date: Jun. 27, 2002

(65) Prior Publication Data

US 2004/0037663 A1 Feb. 26, 2004

(30) Foreign Application Priority Data

Dec. 20, 2000 (DE) ................................. 100 63 628

(51) Int. Cl.$^7$ ................................................ B25J 5/00
(52) U.S. Cl. ................... 414/680; 74/490.06; 212/334; 212/317; 414/591; 901/29
(58) Field of Search ............................... 414/680, 591, 414/917; 212/334, 317; 74/490.01, 490.06; 901/28, 29

(56) References Cited

U.S. PATENT DOCUMENTS 4,761,112 A * 8/1988 Hammon et al. ........... 414/591

(Continued)

FOREIGN PATENT DOCUMENTS

DE      196 14 641 A1     10/1997

(Continued)

OTHER PUBLICATIONS

"A Hybrid Manipulator Structure for Laser Welding", Tonshoff and Soehner.*

(Continued)

Primary Examiner—Donald W. Underwood
(74) Attorney, Agent, or Firm—Milde & Hoffberg, LLP

(57) ABSTRACT

In a device for the translatory positioning of a platform (1), in particular a tool mount, with articulated rods (2a, 2'a9 of invariable length, whose first ends are hinged to he platform (1), and whose second ends are coupled with respectively independent rail-mounted slide blocks (3), wherein the coupling points (9) on the platform (1) and coupling points (11) on the sliding blocks (3) respectively do not lie on a straight line, and the articulated rods (2a, 2'a) do not run parallel to either each other or a shared plane, only three independent sliding blocks (3) and accompanying initial articulated rods (2a, 2'a) are present. In a first variant, at least one of the coupling points (11) on the sliding blocks (3) is offset relative to the rail axis (4a), and all sliding blocks (3) are arranged on the same rail (4). In a second variant, all sliding block (3) are arranged on the same side horizontally next to the space provided for postioning the platform (1), and essentially run parallel to each other. Three restrictive guides (2b; 23–27) are formed for the platform (1), which are each secured to a sliding block (3) or the accompanying first articulated rod (2a, 2'a), and each permit one rotation of the platform (1) relative to the sliding block (3) only around two rotational axes, while preventing rotation around a third rotational axis, wherein the respective third rotational axes do not run parallel to each other, and do not lie in a shared plane.

13 Claims, 8 Drawing Sheets

U.S. PATENT DOCUMENTS 4,976,582 A    12/1990   Clavel
6,099,217 A    8/2000   Wiegand et al.

FOREIGN PATENT DOCUMENTS

| EP | 0 491 613 B1 | 6/1992 |
| WO | WO 97/22436 | 6/1997 |
| WO | WO 99/32256 | 7/1999 |

OTHER PUBLICATIONS

Heisel/Hestermann, HK May 1999, 72-74.

Industrieanzeiger 51-52/97, Alpenland Mischt Unter Den Grossen Mit.

"Analysis and Design of 6-Dof 6-Prrs Parallel Manipulators", Ilian Bonev.

"A Platform With Six Degrees of Freedoom", D. Stewart, Proc. INP Mech Engr 1965-66, vol. 180 PT 1, No. 15, PP 371-386.

"A Stewart Platform-Based Manipulator: General Theory and Practical Construction" E. F. Fichter, Orgeon State, Ind. Eng. Dept., pp. 157-182.

"Parallelroboter in der Handhabungstechnik—Bauformen, berechungsverfahren, Einsatzgebiete" Dr. H. Kerle, Berichte Nr. 111, 1994 pp. 207-227.

"Der Hexapod", Sonderdruck aus maschine + werkzeug Oct. 1999, 6 pgs.

"Systematischer Entwurf und Simulation parallerler Bewegungsmechanismen" Fraunhofer IWU Jahresbencht 1999, pp 44-45.

"Ausbruch aus dem Koordinatensystem", Scope, Jun. 2000, pp 36-38.

* cited by examiner

DEVICE FOR THE TRANSLATORY POSITIONING OF A PLATFORM

The invention relates to a device for the translatory positioning of a platform, in particular a tool mount, with articulated rods of invariable length, whose first ends are hinged to the platform, and whose second ends are coupled with respectively independent rail-mounted slide blocks, wherein the coupling points on the platform and coupling points on the sliding blocks respectively do not lie on a straight line, and the articulated rods do not run parallel to either each other or a shared plane.

Such devices are known as hexaglides, e.g., from Heisel/Hestermann, HK 5/1999, 72, 74. Shifting the sliding blocks changes the distance between the coupling points of the invariable-length articulated rods perpendicular to the rails, and hence alters the position and orientation of the platform in space. It is also known to limit the number of drives to the required directions of movement by inhibiting degrees of freedom, e.g., via parallel motion.

For example, U.S. Pat. No. 4,976,582 proposes a device in which three parallelograms are arranged offset by 120° relative to each other on the periphery of the platform. At their end facing away from the platform, the parallelograms are each connected with a control rod, which themselves are coupled with a fixed base plate again offset by 120° relative to each other by means of a shaft. Each of these control rods can be swiveled by a drive around the shaft axis on the base plate in order to move the platform. Instead of swiveling the control rods, they can also be shifted along straight guides, wherein the guides are also again arranged around the platform offset by 180° relative to each other, and hence run radially relative to each other.

Also known from EP 0 491 613 B1 is a device in which a platform is moved via parallel guides arranged on the periphery of a base plate offset relative to each other by 120°.

The disadvantage to these known devices is that they require a relatively great deal of construction area in relation to the work area in which the platform can be moved or positioned, both in the vertical direction and in the horizontal direction, thereby also impeding accessibility. In addition, they are cost-intensive due to the complex structures.

By contrast, the object of this invention is to improve a generic arrangement in such a way as to increase the work area/construction area ratio, improve accessibility and lower the cost outlay.

According to the invention, this task is achieved in an arrangement of the kind mentioned at the outset by virtue of the fact that only three independent sliding blocks and accompanying initial articulated rods are present, and at least one of the coupling points on the sliding blocks is offset relative to the rail axis, and all sliding blocks are arranged on the same rail, and that the platform has three restrictive guides each secured to one sliding block or the accompanying first articulated rod, and each permit one rotation of the platform relative to the sliding block only around two rotational axes, while preventing rotation around a third rotational axis, wherein the respective third rotational axes do not run parallel to each other, and do not lie in a shared plane.

In this solution according to the invention, only one rail is required for the spatial positioning of a platform. Three independently driven sliding blocks are sequentially arranged one in back of the other on this rail, and coupled with at least one articulated rod offset relative to the rail axis. This ensures a stable position of the platform in space in conjunction with the three restrictive guides.

By suitable moving the sliding blocks separately along this one rail, i.e., by suitably positioning the sliding blocks relative to each other on this one rail, the platform can be brought in the desired position transverse to the longitudinal direction of the rail. Arranging all three sliding blocks on one rail distinctly reduces the space that is required transverse to the rail. This freed space can be used to more easily introduce work pieces to be machined, or to set up machine tools or machining equipment with an arrangement according to the invention with narrower spatial conditions.

The arrangement of all three sliding blocks on only one rail also enables the cost-effective shared use of driving elements by the sliding blocks. For example, a ball screw spindle, toothed rack or secondary linear motor line can be built into the rail, while the sliding blocks exhibit the respective accompanying driving elements, which enable a drive independent of the other two sliding blocks. For example, if the sliding blocks are driven by means of a linear motor on a shared secondary line, the sliding blocks exhibit the respective primary parts.

The object underlying the invention is also achieved by virtue of the fact that only three independent sliding blocks and accompanying first articulated rods are present, and all sliding blocks are arranged on the same side horizontally next to the space provided for positioning the platform, and routed essentially parallel to each other, and that three restrictive guides are provided for the platform, which are each secured to one sliding block or the accompanying first articulated rod, and each permit one rotation of the platform relative to the sliding blocks around only two rotational axes, and prevent rotation around a third rotational axis, wherein the respective third rotational axes do not run parallel to each other, and do not lie in a shared plane.

In this solution according to the invention, the three independent sliding blocks are arranged horizontally next to the work space provided for the platform, which reduces the overall height, and also makes the work area completely freely accessible from both the other horizontal side and from above. In the case of a machine tool equipped with the arrangement according to the invention, the tools to be machined can then be introduced or removed from above with a crane or from the side. As a result, operations are subject to fewer constraints, and can be variably adapted to the respective requirements. Other advantages to the rails or rail arranged next to the work space of the platform are that such an arrangement can easily be constructed based on already available, conventional machine concepts, and that mounting or attachment devices for the rail(s) can be easily designed as a single piece with the mounting or attachment device of a machine tool for a work piece to be machined, e.g., in the form of a right angle. In addition, only one mounting or attachment device needs to be provided between two adjacent machine tools, since rails can be secured on both opposing sides of this device.

In this case too, an advantageous embodiment can have at least one of the coupling points on the sliding blocks be offset relative to the rail axis, and all sliding blocks arranged on the same rail. These measures not only further reduce the overall height, but also further reduce costs.

In an advantageous further development of the invention, if all sliding blocks are arranged on only one rail, the coupling point on the middle sliding block is shifted to one side of the rail, and the two coupling points on the outer sliding blocks are offset to the other side of the rail. This makes the distance between the coupling points as large as possible transverse to the longitudinal direction of the rail, and hence the stiffness of the structure comprised of invariable-length articulated rods and platform as high as possible.

Preferably the sliding blocks and the platform exhibit mutually parallel surfaces on their facing sides. By these means the design of the restrictive guides can be unified and thus design and mounting simplified.

In a preferred embodiment of the invention, in order to set up or form at least one of the restrictive guides, a second invariable-length articulated rod runs next to a first articulated rod, and both articulated rods form a parallelogram. With the help of these measures a particularly inexpensive design of restrictive guides can be reached.

However, for the setting up of at least one of the restrictive guides, it is also possible, for example, to fork the two ends of a first articulated rod, to mount a first restrictive guide element in each fork in such a way that it can pivot around a first rotational axis, to mount a second restrictive guide element in the first restrictive guide element in such a way that it can swivel around a second rotational axis, which does not run parallel to the first rotational axis, and to rigidly secure the second restrictive guide element to the platform or accompanying sliding block.

According to the invention, a machine tool with an arrangement as described above is additionally proposed, wherein a tool is secured to the platform.

In this case, the tool is preferably designed so that it can swivel relative to the platform.

Further, the invention proposes a transporting device with an arrangement as described above, wherein a mounting device for the articles to be transported is secured to the platform.

The invention will be described in greater detail below by way of example based on the drawing, in which.

Figure 1:
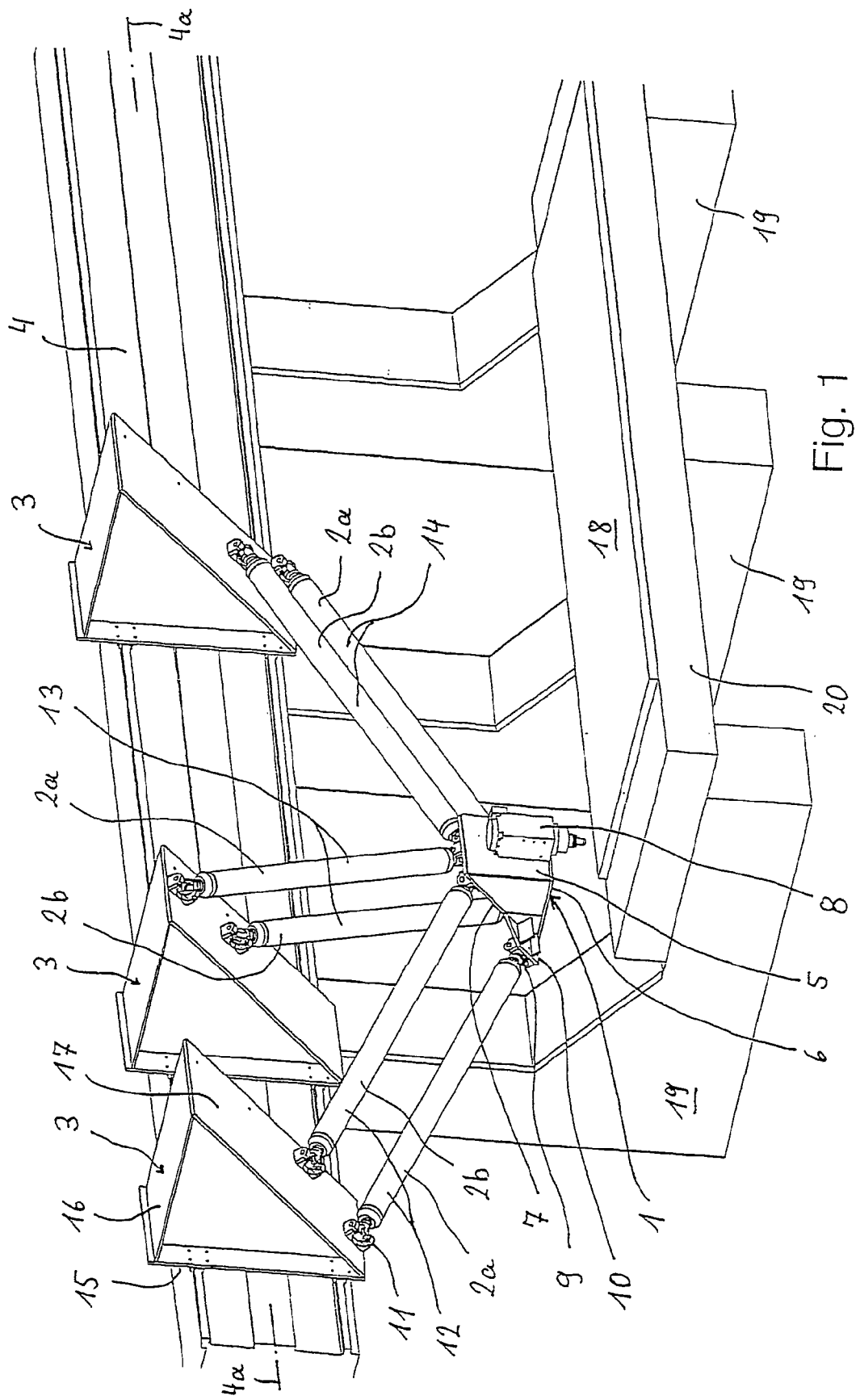
FIG. 1 is a perspective view of a first embodiment of an arrangement according to the invention as part of a machine tool.

The embodiments of an arrangement according to the invention shown on the figures exhibit a platform 1, invariable-length coupling rods 2a, 2b, sliding blocks 3, and only a single rail 4, on which all sliding blocks 3 are arranged, and along which they can traverse.

The articulated rods 2a, 2b link the platform 1 with the sliding block 3 and hold the platform 1 in a statically stable position. Shifting the sliding blocks 3 along the rail 4 alters the position of the platform 1 in the x, y and z directions, wherein the maximal possible positions determine the work area of the platform 1. The orientation of the platform 1 here remains constant, i.e., its alignment in the area, and hence relative to the sliding blocks 3 or the rail 4, does not change.

The sliding blocks can be traversed relative to each other via the CNC (computerized numerical control) axes. The traveling motions of the sliding blocks 3 on the rail 4 generate a spatial movement of the platform 1 via the coupling of articulated rods 2a, 2b. A kinematics-dependent real-time transformation in the CNC controller computes the movement of the sliding blocks 3, in so doing generating a predetermined path in the X, Y, Z coordinate system on the platform 1.

The platform 1, which is also called the end effector, is designed as a right-angled triangle cross-sectionally transverse to the longitudinal direction of the rails, wherein the surfaces 5, 6 forming the right angle are vertically or horizontally aligned, and the inclined surface 7 runs at an angle of about 45°, and faces the rail 4 (FIG. 1). A tool 8, e.g., a milling spindle, is secured to the vertical surface 5 of the platform 1, and projects downward over the horizontal surface 6.

Three first 2a and three second 2b invariable-length articulated rods are secured to the inclined surface 7 of the platform 1 via cardan joints 9, wherein two first articulated rods 2a are attached to projections 10 on the inclined surface 7, whose lower edge extends over the horizontal and vertical surface 6, 5 in the longitudinal direction of the rail. The third, middle articulated rod 2a is secured to the top edge of the inclined surface 7. A first and second articulated rod 2a, 2b run parallel to each other, and are equally long and also each attached with cardan joints 11 to a sliding block 3, wherein the respective sliding blocks 3 have secured to them two outlying articulated rod pairs downwardly offset relative to the rail axis 4a, and the middle articulated rod pair upwardly offset relative to the rail axis 4a. Each of these three articulated rod pairs hence forms a parallelogram 12, 13, 14.

The three parallelograms 12, 13 14 form three restrictive guides for the platform 1. Each parallelogram 12, 13, 14 permits the rotation or swiveling of the platform 1 around two rotational axes, and prevents a swiveling of platform 1 around a rotational axis running perpendicular to the parallelogram plane. The parallelograms 12, 13, 14 run parallel neither to each other, nor to a shared plane, i.e., the parallelograms 12, 13, 14 extend in all three spatial directions. This prevents any rotation of the platform 1 relative to the sliding blocks 3, and hence in the area at all, since a rotation of the platform 1 around all three possible independent spatial rotational axes is precluded.

The ends of the articulated rods 2a, 2b facing away from the platform 1 are attached by means of cardanic joints 11 to the sliding blocks 3, wherein each parallelogram 12, 13, 14 is coupled to a suitable sliding block 3.

Similarly to platform 1, each of the three sliding blocks 3 is designed cross sectionally transverse to the longitudinal direction in the form of a right-angled triangle, wherein the surfaces 15, 16 forming the right angles are also aligned vertically or horizontally, and the inclined surface 7 runs at an angle of about 45°, and faces the platform 1. The articulated rods 2a, 2b of a parallelogram are coupled with these inclined surfaces 17.

The rail or guide path 4 on which the sliding blocks 3 are sequentially arranged one after the other is horizontally situated next to the work space, i.e., also next to a work piece 18 to be machined, for example. The rail 4 is secured to a series of L-shaped carriers 19, wherein the sliding blocks 3 are secured to the inside of the one leg of the L, and the work piece 18 to the same inside of the other leg of the L. The position of the platform 1 or a tool 8 secured to the platform 1 is set by correspondingly shifting one or two or three sliding blocks 3 relative to each other. In this way, the tool 8 can be positioned in the Y direction, or horizontally transverse to the rail 4, and also in the Z direction, or vertically transverse to the rail 4. In addition, this also makes a limited positioning of the tool 8 in the X direction, meaning in the direction of the rail 4. However, uniformly shifting all three sliding blocks 3 in a corresponding manner along the guide path 4 facilitates shifting in an X-direction, and is the only way to do so for longer paths.

Figure 2:
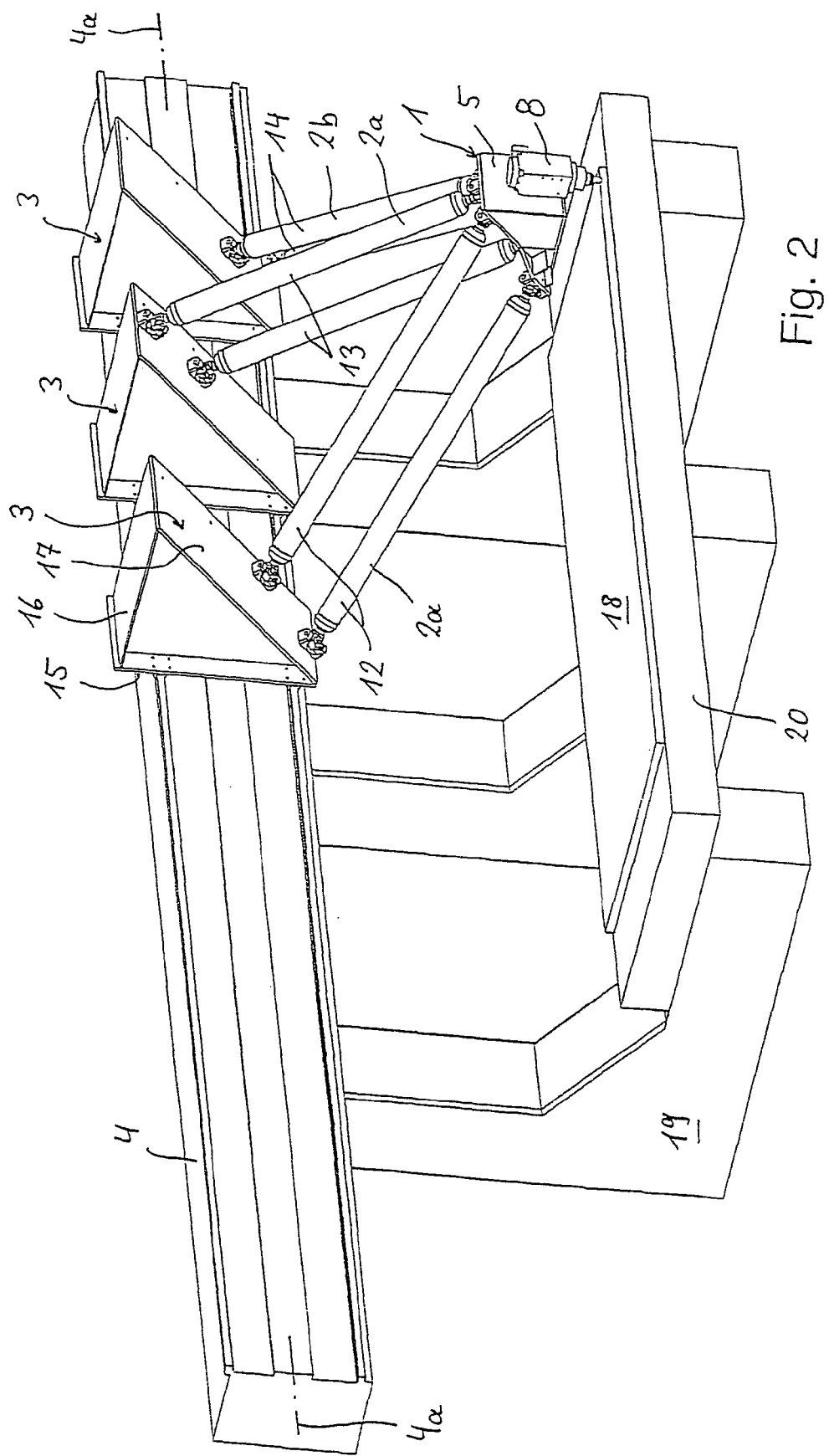
FIG. 2 is the arrangement from FIG. 1, wherein the position of the platform is altered relative to FIG. 1.

A comparison of FIGS. 1 and 2 shows the corresponding shifts of the sliding blocks 3 on the guide path 4 and relative to each other in order to shift a tool 8 from one position via the work piece 18 in the diagonal direction and recessed toward the work piece 18.

On FIG. 1, the platform 1 with a milling spindle 8 secured to it stands in the left and rear position relative to a supporting table 20 or a work piece 18 to be machined lying thereupon, wherein the milling spindle 8 is arranged vertically at a distance from the work piece 18. On FIG. 2, the platform 1 with the milling spindle 8 stands in the right front position relative to the supporting table 20, wherein the milling spindle 8 sits upon the work piece 18.

Figure 3:
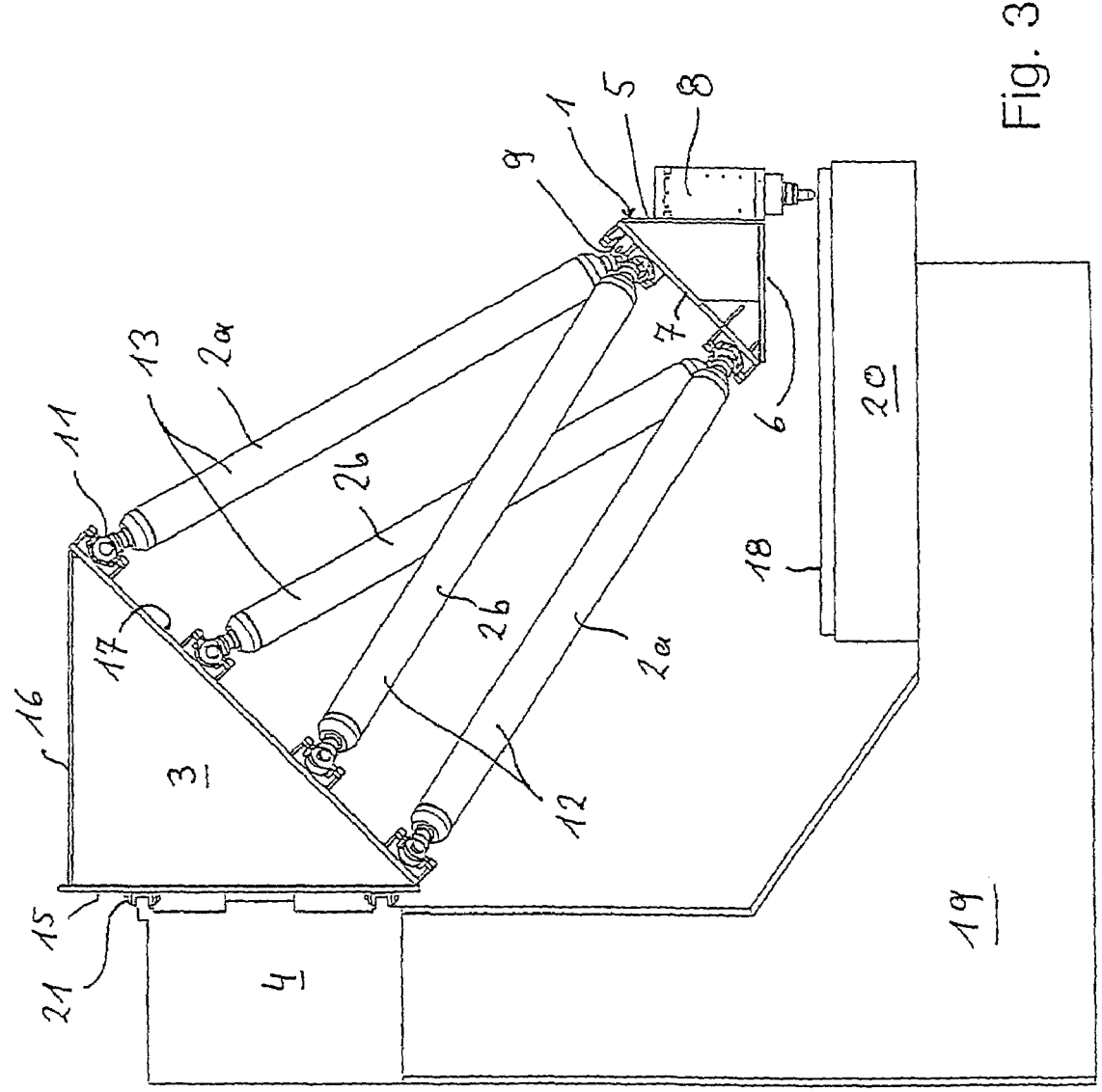
FIG. 3 is a side view of the arrangement from FIG. 2, with a toothed rack drive for the sliding blocks.
Figure 4:
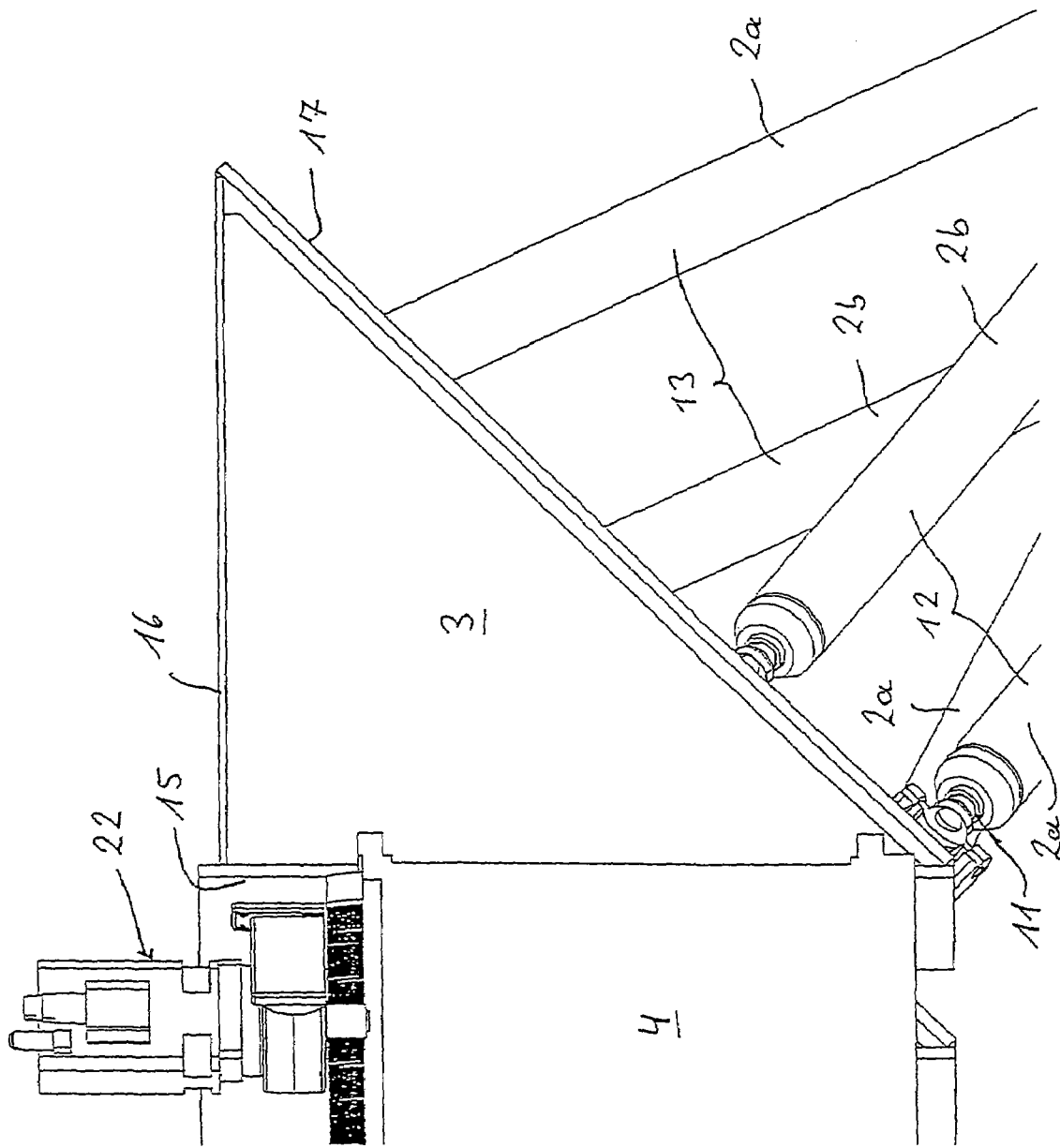
FIG. 4 is a side view of a sliding block with linear motor drive on a magnified scale.

A single feed element for all sliding blocks 3 is built into the guide path 4, wherein the sliding blocks 3 can be moved independently of one another on the feed element. The sliding blocks 3 can be moved on the guide path or rail 4 by means of various drives, e.g., using a ball screw spindle or toothed rack 21 integrated into the rail 4 (as shown on FIG. 3), or by designing the rail 4 as a secondary linear motor line. Consequently, the sliding block 3 exhibits a gearing and servomotor or the primary parts 22 of a linear motor 2, and is controlled by a CNC controller. FIG. 4 shows such a linear motor drive with primary parts 22 secured to the sliding block 3. The necessary linear measuring systems have not been shown on the figures for reasons of clarity.

Figure 5:
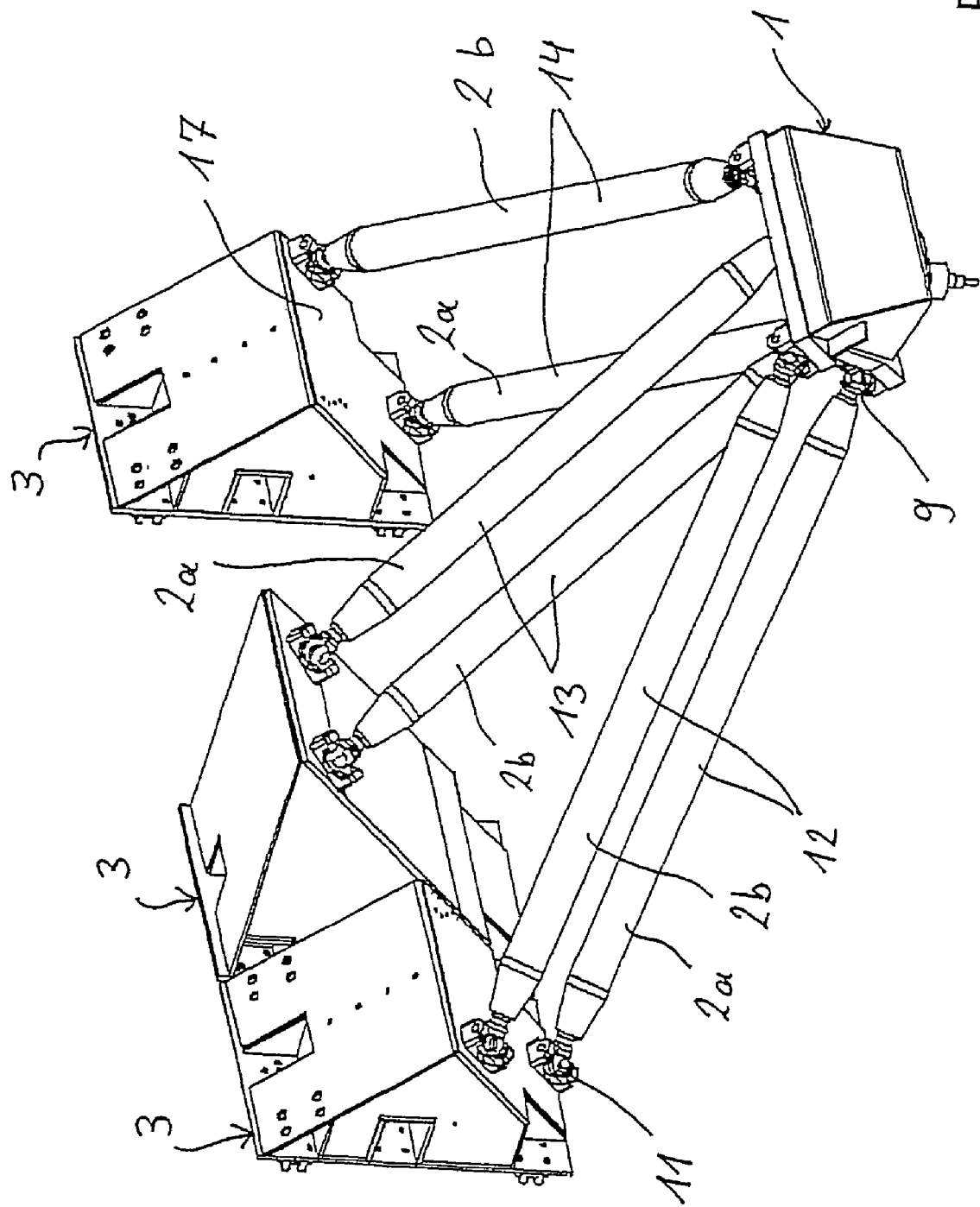
FIG. 5 is a perspective view similar to FIG. 1 of a second embodiment of an arrangement according to the invention, shown without a rail and work piece.

The respective restrictive guides on their sliding blocks can be oriented or aligned in any suitable manner. For example, the middle parallelogram 13 shown on FIGS. 1 and 2 is aligned perpendicular, i.e., vertically, to the rail or guide axis 4a. In another embodiment (FIG. 5), this middle parallelogram 13 is aligned parallel, i.e., horizontally, to the rail or guide axis 4a. The alignment of both outlying parallelograms 12 and 13 can also be adapted to special respective requirements. For example, the respective upper articulated rod 2b of these parallelograms 12, 14 is shifted toward the middle parallelogram 13 in the arrangement shown by example on FIGS. 1 and 2, while shifted in the opposite direction toward the outside in the embodiment according to FIG. 5.

Figure 6:
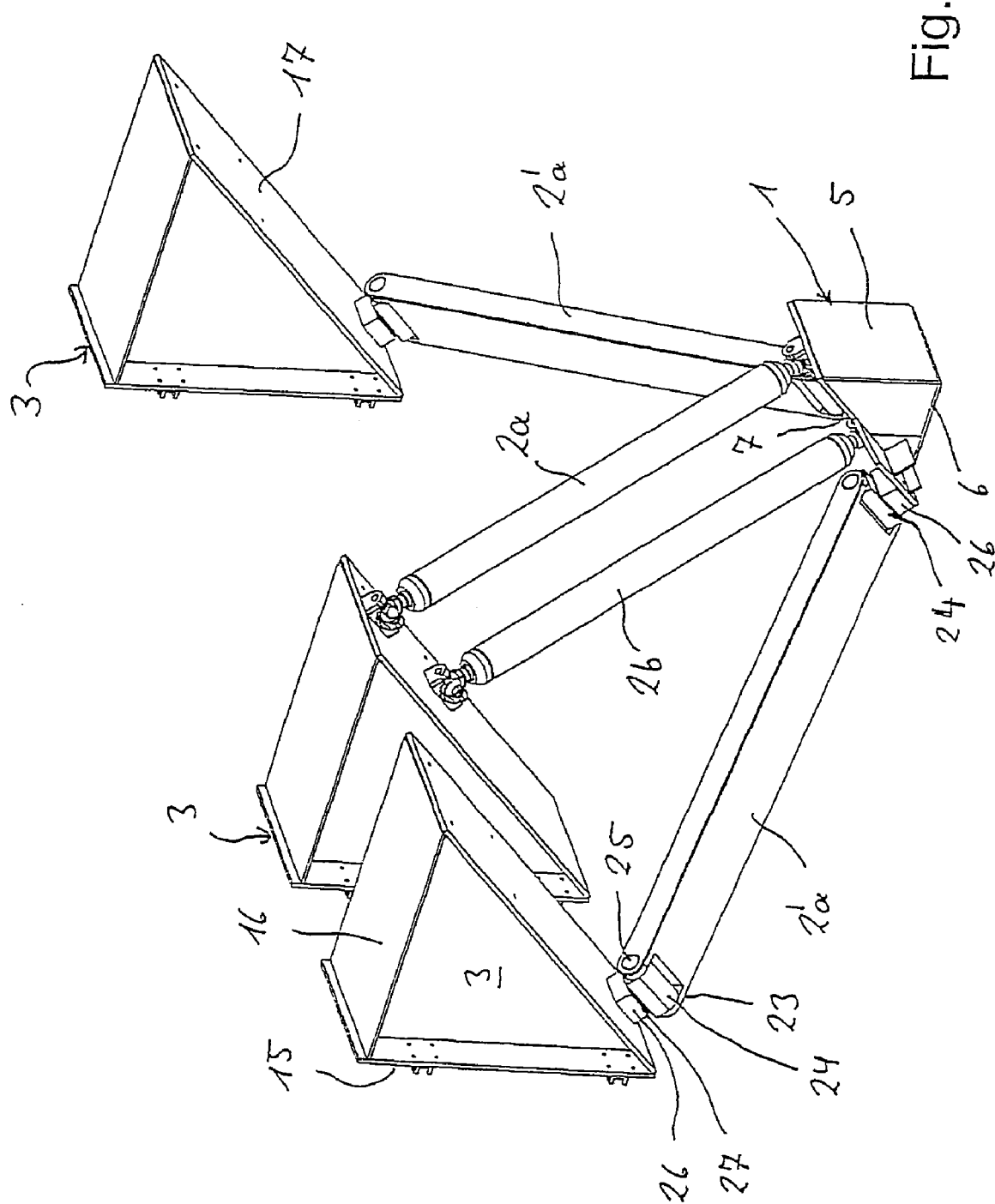
FIG. 6 is a perspective view similar to FIG. 1 of a third embodiment of an arrangement according to the invention, shown without a rail and work piece.

FIG 6 shows a third embodiment of an arrangement or device according to the invention. In this embodiment, only one of the restrictive guides is designed as a parallelogram 13, while the two other restrictive guides are comprised of articulated rods 2a' whose two ends are each forked. A first restrictive guide element 24 is mounted in each fork 23 in such a way that it can pivot around a first rotational axis 25, wherein these two first rotational axes 25 of an articulated rod 2a' run parallel to each other. A second restrictive guide element 26 is mounted in each first restrictive guide element 24 in such a way that it can swivel around a second rotational axis 27, wherein the second rotational axis 27 runs perpendicular to the first rotational axis 25. The second restrictive guide elements 26 are rigidly secured to the platform 1 or the accompanying sliding block 3. The first and second restrictive guide element 24, 26 each enable a turn around a rotational axis 25, 27, and prevent a turning or swiveling of the platform around the third rotational axis standing perpendicular on the first two rotational axes 25, 27.

Figure 7:
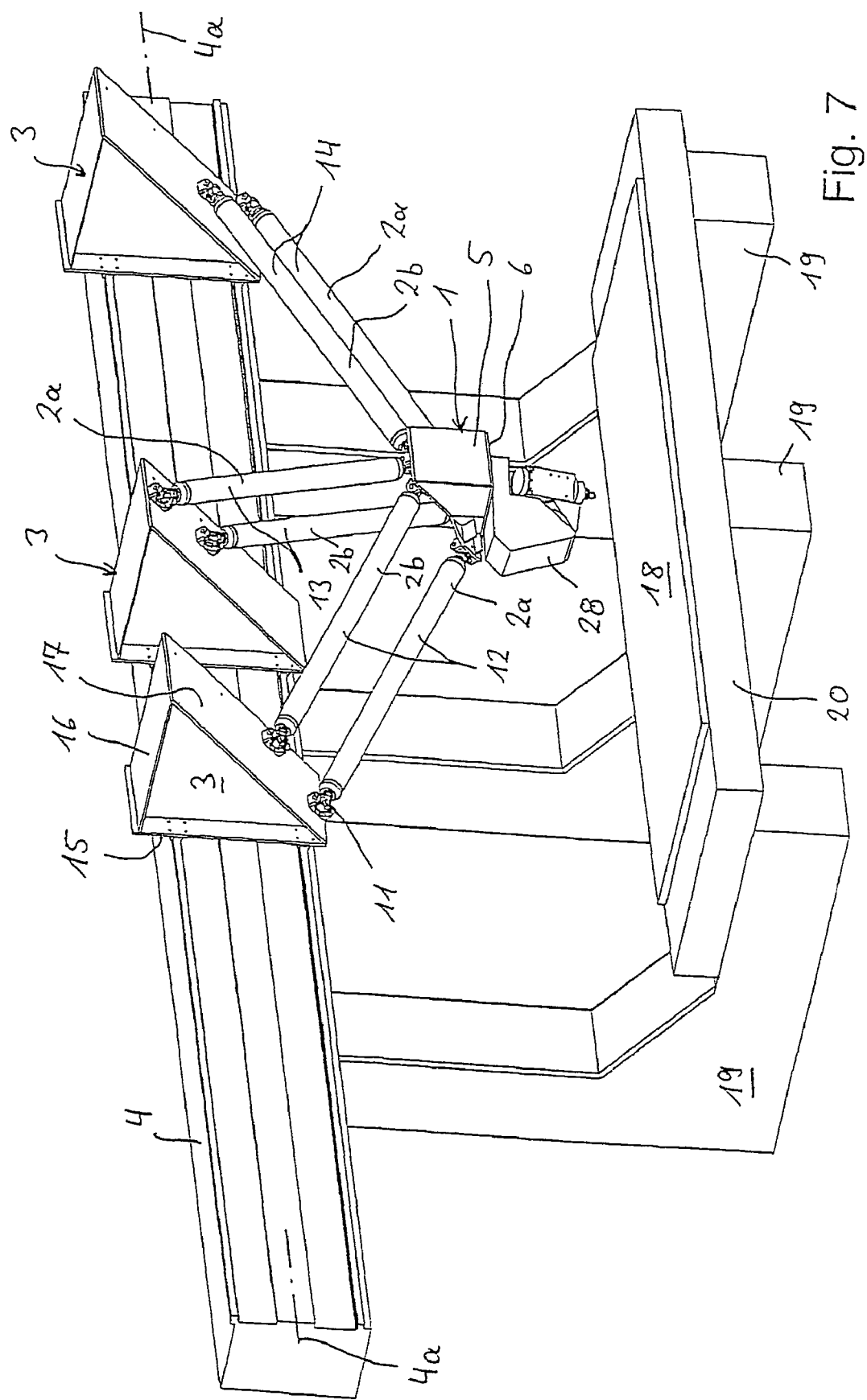
FIG. 7 is the arrangement from FIG. 1 or 2, with a swivelable tool attached to the platform.

As shown on FIG. 7, a swivelable tool or working aggregate 28 can be secured to the platform 1, on the lower, horizontal surface 6 in the embodiment depicted. Such a multiple swiveling unit 28 can be a milling motor, a laser cutting head, a water cutting head, a pinion type cutter, a glass cutter, a boring aggregate, etc. In this way, a 2-axis swiveling unit 28 is used to expand a machine tool with an arrangement according to the invention for the translatory positioning of the platform 1 into a 5-axis machine tool.

Figure 8:
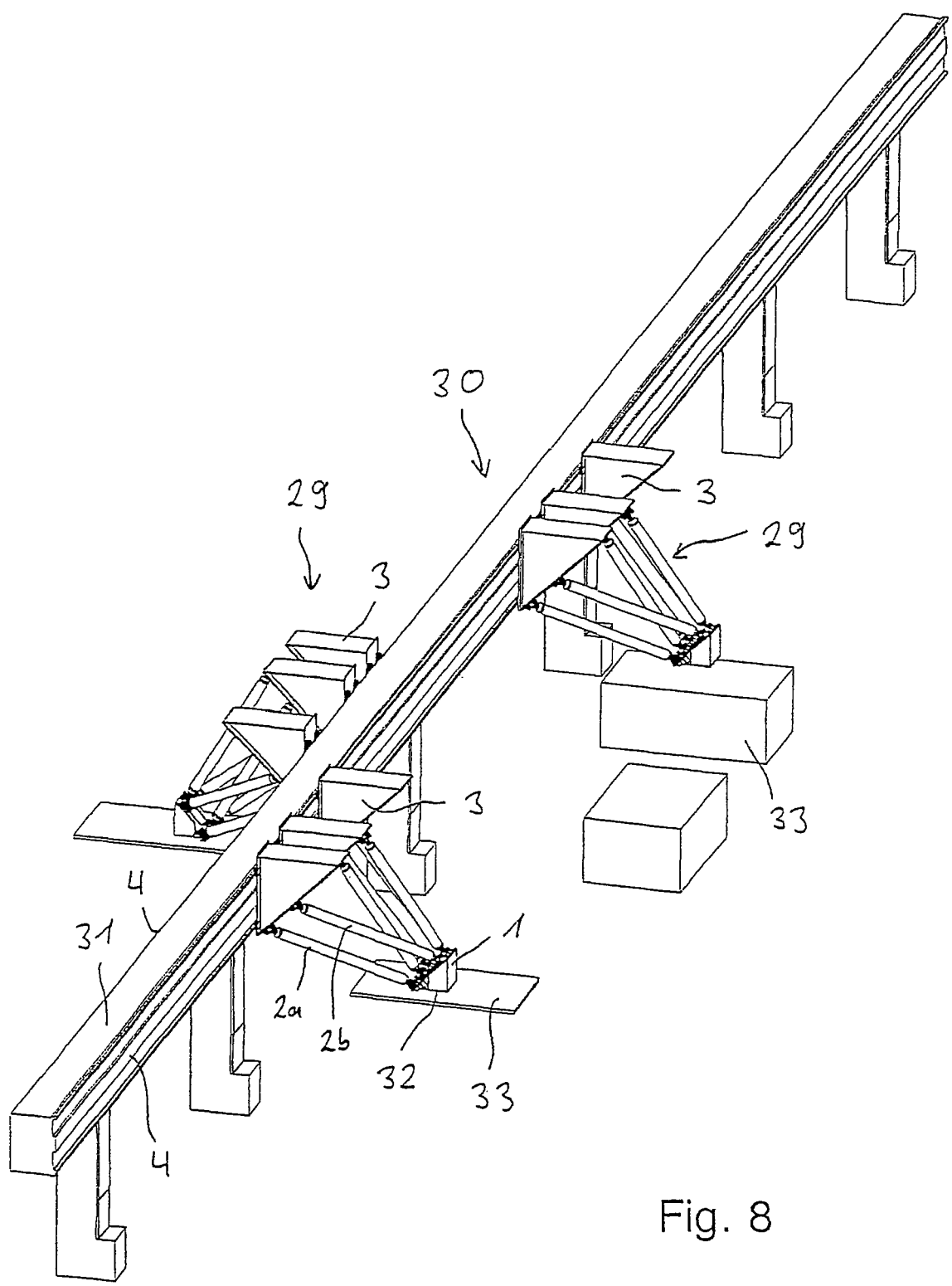
FIG. 8 is a perspective view of a transporting device according to the invention.

FIG. 8 shows the use of an arrangement according to the invention for handling purposes. In the embodiment shown, three arrangements 29 according to the invention are built into a transporting device 30. A rail 4 is secured on either side of a carrier 31, wherein the articulated rods attached to the respective three sliding blocks are not shown for reasons of clarity. An arrangement 29 runs into the back rail 4 not visible on FIG. 8, while two arrangements 29 run in the front, visible rail 4. Mounting devices 32 for the articles 33 to be transported are secured to the platform 1, e.g., special grippers or vacuum suction devices. In particular when the arrangement 29 according to the invention has only one side or rail per side, e.g., when all sliding blocks on one side are arranged on this one rail 4, it is possible to set up a space-saving and cost-effective transporting device 30.

What is claimed is:

1. In a device for the translatory positioning of a platform with articulated rods of invariable length having first and second ends, whose first ends are hinged to the platform, and whose second ends are coupled with respectively independent rail-mounted slide blocks, wherein the coupling points on the platform and coupling points on the sliding blocks, respectively, do not lie on a straight line, and the articulated rods do not extend parallel to either each other or a shared plane, the improvement wherein, only three independent sliding blocks and accompanying initial articulated rods are present, and at least one of the coupling points on the sliding blocks is offset relative to a rail axis, and all sliding blocks are arranged on a same rail defining said rail axis, wherein movement of the platform is limited by three restrictive guides, each guide secured between at least one of (1) a sliding block and the platform and (2) at the ends of one of the articulated rods connecting the rod to its respective sliding block and the platform, and wherein each guide permits one rotation of the platform relative to the sliding block only about two rotational axes while preventing rotation about a third rotational axis, and wherein the respective third rotational axis of each sliding block does not extend parallel to the third rotational axes of the other sliding blocks, and does not lie in a shared plane.

2. In a device for the translatory positioning of a platform with articulated rods of invariable length having first and second ends, whose first ends are hinged to the platform, and whose second ends are coupled with respectively independent rail-mounted slide blocks, wherein the coupling points on the platform and coupling points on the sliding blocks, respectively, do not lie on a straight line, and the articulated rods do not extend parallel to either each other or a shared plane, the improvement wherein, only three independent sliding blocks and accompanying initial articulated rods are present, and at least one of the coupling points on the sliding blocks is offset relative to a rail axis, and all sliding blocks are arranged on a same side of the rail axis, horizontially next to the space provided for positioning the platform, and routed essentially parallel to each other, wherein movement of the platform is limited by three restrictive guides, each guide secured between at least one of (1) a sliding block and the platform and (2) at the ends of one of the articulated rods connecting the rod to its respective sliding block and the platform,, and wherein each guide permits one rotation of the platform relative to the sliding block only about two rotational axes while preventing rotation about a third rotational axis, and wherein the respective third rotational axis of each sliding block does not extend parallel to the third rotational axes of the other sliding blocks, and does not lie in a shared plane.

3. The device according to claim 2, wherein at least one of the coupling points on the sliding blocks is shifted relative to the rail axis, and all sliding blocks are arranged on the same rail.

4. The device according to claim 1, wherein the coupling point on the middle sliding block is shifted to one side of the rail, and the two coupling points on the outer sliding blocks are offset to the other side of the rail.

5. The device according to claim 1, wherein the sliding blocks and the platform exhibit mutually parallel surfaces on their facing sides.

6. The device according to claim 1, wherein to set up at least one of the restrictive guides, a second invariable-length articulated rod extends next to a first articulated rod, and both articulated rods and their respective sliding block and the platform form a parallelogram.

7. The device according to claim 1, wherein to set up at least one of the restrictive guides, the two ends of one of the articulated rods are forked, a first restrictive guide element is mounted in each fork in such a way that it can pivot around a first rotational axis, a second restrictive guide element is mounted in the first restrictive guide element in such a way that it can swivel around a second rotational axis, which does not extend parallel to the first rotational axis, and the second restrictive guide element is rigidly secured to the platform or accompanying sliding block.

8. A machine tool with a device for the translatory positioning of a platform with articulated rods of invariable length having first and second ends, whose first ends are hinged to the platform, and whose second ends are coupled with respectively independent rail-mounted slide blocks, wherein the coupling points on the platform and coupling points on the sliding blocks, respectively, do not lie on a straight line, and the articulated rods do not extend parallel to either each other or a shared plane, the improvement wherein, only three independent sliding blocks and accompanying initial articulated rods are present, and at least one of the coupling points on the sliding blocks is offset relative to a rail axis, and all sliding blocks are arranged on a same rail defining said rail axis, wherein movement of the platform is limited by three restrictive guides, each guide secured between at least one of (1) a sliding block and the platform and (2) at the ends of one of the articulated rods connecting the rod to its respective sliding block and the platform, and wherein each guide permits one rotation of the platform relative to the sliding block only about two rotational axes while preventing rotation about a third rotational axis, wherein the respective third rotational axis of each sliding block does not extend parallel to the third rotational axes of the other sliding blocks, and does not lie in a shared plane and wherein a tool is secured to the platform.

9. The machine tool according to claim 8, further comprising means for allowing a tool to be swiveled relative to the platform.

10. A transporting device with a device for the translatory positioning of a platform with articulated rods of invariable length having first and second ends, whose first ends are hinged to the platform, and whose second ends are coupled with respectively independent rail-mounted slide blocks, wherein the coupling points on the platform and coupling points on the sliding blocks, respectively, do not lie on a straight line, and the articulated rods do not extend parallel to either each other or a shared plane, the improvement wherein, only three independent sliding blocks and accompanying initial articulated rods are present, and at least one of the coupling points on the sliding blocks is offset relative to a rail axis, and all sliding blocks are arranged on a same rail defining said rail axis, wherein movement of the platform is limited by three restrictive guides, each guide secured between at least one of (1) a sliding block and the platform and (2) at the ends of one of the articulated rods connecting the rod to its respective sliding block and the platform, and wherein each guide permits one rotation of the platform relative to the sliding block only about two rotational axes while preventing rotation about a third rotational axis, wherein the respective third rotational axis of each sliding block does not extend parallel to the third rotational axes of the other sliding blocks, and does not lie in a shared plane and wherein a mounting device for an article to be transported is secured to the platform.

11. A machine with a device for the translatory positioning of a platform with articulated rods of invariable length having first and second ends, whose first ends are hinged to the platform, and whose second ends are coupled with respectively independent rail-mounted slide blocks, wherein the coupling points on the platform and coupling points on the sliding blocks, respectively, do not lie on a straight line, and the articulated rods do not extend parallel to either each other or a shared plane, the improvement wherein, only three independent sliding blocks and accompanying initial articulated rods are present, and at least one of the coupling points on the sliding blocks is offset relative to a rail axis, and all sliding blocks are arranged on a same side of the rail axis horizontally next to the space provided for positioning the platform, and routed essentially parallel to each other, wherein movement of the platform is limited by three restrictive guides, each guide secured between at least one of (1) a sliding block and the platform and (2) at the ends of one of the articulated rods connecting the rod to its respective sliding block and the platform, and wherein each guide permits one rotation of the platform relative to the sliding block only about two rotational axes while preventing rotation about a third rotational axis, wherein the respective third rotational axis of each sliding block does not extend parallel to the third rotational axes of the other sliding blocks, and does not lie in a shared plane, and wherein a tool is secured to the platform.

12. The machine according to claim 11, further comprising means for allowing the tool to be swiveled relative to the platform.

13. A transporting device with a device for the translatory positioning of a platform with articulated rods of invariable length having first and second ends, whose first ends are hinged to the platform, and whose second ends are coupled with respectively independent rail-mounted slide blocks, wherein the coupling points on the platform and coupling points on the sliding blocks, respectively, do not lie on a straight line, and the articulated rods do not extend parallel to either each other or a shared plane, the improvement wherein, only three independent sliding blocks and accompanying initial articulated rods are present, and at least one of the coupling points on the sliding blocks is offset relative to a rail axis, and all sliding blocks are arranged on a same side of the rail axis horizontally next to the space provided for positioning the platform, and routed essentially parallel to each other, wherein movement of the platform is limited by three restrictive guides, each guide secured between at least one of (1) a sliding block and the platform and (2) at the ends of one of the articulated rods connecting the rod to its respective sliding block and the platform, and wherein each guide permits one rotation of the platform relative to the sliding block only about two rotational axes while preventing rotation about a third rotational axis, wherein the respective third rotational axis of each sliding block does not extend parallel to the third rotational axes of the other sliding blocks, and do not lie in a shared plane, and wherein a mounting device for an article to be transported is secured to the platform.

* * * * *